[19] United States Patent
Knappe et al.

[11] Patent Number: 6,061,431
[45] Date of Patent: May 9, 2000

[54] METHOD FOR HEARING LOSS COMPENSATION IN TELEPHONY SYSTEMS BASED ON TELEPHONE NUMBER RESOLUTION

[75] Inventors: Michael E. Knappe, San Jose, Calif.; David R. Oran, Acton, Mass.

[73] Assignee: Cisco Technology, Inc., San Jose, Calif.

[21] Appl. No.: 09/169,039

[22] Filed: Oct. 9, 1998

[51] Int. Cl.$^7$ .................................................. H04M 11/00
[52] U.S. Cl. ........................... 379/52; 379/347; 379/93.25
[58] Field of Search ..................... 379/52, 93.25, 379/93.14, 347; 381/312, 314, 315

[56] References Cited

U.S. PATENT DOCUMENTS 5,539,806   7/1996  Allen et al. ............................... 379/52
5,802,164   9/1998  Clancy et al. ............................ 379/347

*Primary Examiner*—Wing F. Chan
*Assistant Examiner*—Melur Ramakrishnaiah
*Attorney, Agent, or Firm*—Marger Johnson & McCollom, P.C.

[57] ABSTRACT

Different hearing impairment compensation parameters are stored in a searchable attribute database indexed by the telephone numbers of hearing impaired users. Calls made to or from the stored telephone numbers have incoming voice samples redirected to signal processing resources that perform customized hearing compensation. The compensation parameters are downloaded from the attribute database to the chosen signal processing resource at call setup time. The signal processing resource then compensates the audio signals of the telephone call for specific user hearing impairment using the downloaded compensation parameters.

19 Claims, 4 Drawing Sheets

METHOD FOR HEARING LOSS COMPENSATION IN TELEPHONY SYSTEMS BASED ON TELEPHONE NUMBER RESOLUTION

BACKGROUND OF THE INVENTION

The invention relates to compensating audio signals for the hearing impaired and more particularly to hearing loss compensation for telephony systems.

Persons with hearing impairments have particular trouble understanding conversations conducted over telephones. Some hearing aids include a special magnetic coupling device that magnetically couples audio signals from a telephone handset to the hearing aid. However, not all telephones can be used with magnetic coupling devices. Many public and home telephones have volume controls that compensate for mild hearing loss by simply increasing the volume of the audio signals coming out of the telephone handset. However, volume controls amplify the entire audio signal and do not compensate for the particular frequencies associated with a particular user's dependent hearing impediment.

Telephone volume controls generally must be manually adjusted every time someone with a hearing impediment uses the telephone. A person with normal hearing, who wishes to use the same telephone, must then readjust the telephone back to a normal volume level. Increasing local gain in the telephone handset also increases noise reflected back to the telephone receiver from the listener's local. This decreases the ability to distinguish speech from the amplified background noise.

According a need remains for a system that automatically tailors audio signal compensation for individual hearing impaired telephone users.

SUMMARY OF THE INVENTION

Hearing compensation parameters are stored in a searchable attribute database associated with a user's telephone number. Telephone calls made to or from that hearing impaired user's telephone number are monitored. The attribute database examines both called and calling telephone numbers for a match with stored telephone numbers associated with hearing impaired users. Each telephone number in the attribute database provides an index to records containing perceptual coding, gain and/or frequency shaping parameters tailored to a particular user. The compensation parameters associated with a matching telephone number are downloaded from the attribute database to the signal processing resources at call setup time. Upon successful signaling setup of a call to that telephone number, incoming audio samples are redirected to signal processing resources. The signal processing resources then compensate the audio signals according to the downloaded compensation parameters. If applicable, the signal processing resources are reloaded on subsequent calls with the compensation parameters associated with other hearing impaired users.

The hearing loss compensation system automatically tailors audio signal encoding and decoding to the user receiving the audio signal. This not only makes for more effective audio signal compensation but also makes more efficient use of network bandwidth by transmitting only the audio frequencies within the hearing range of the hearing impaired user. Because the signal processing resources used for compensating the audio signals already exist as general resources in the communications network, audio compensation is readily integrated into existing communication systems.

The foregoing and other objects, features and advantages of the invention will become more readily apparent from the following detailed description of a preferred embodiment of the invention, which proceeds with reference to the accompanying drawings.

DETAILED DESCRIPTION

Figure 1:
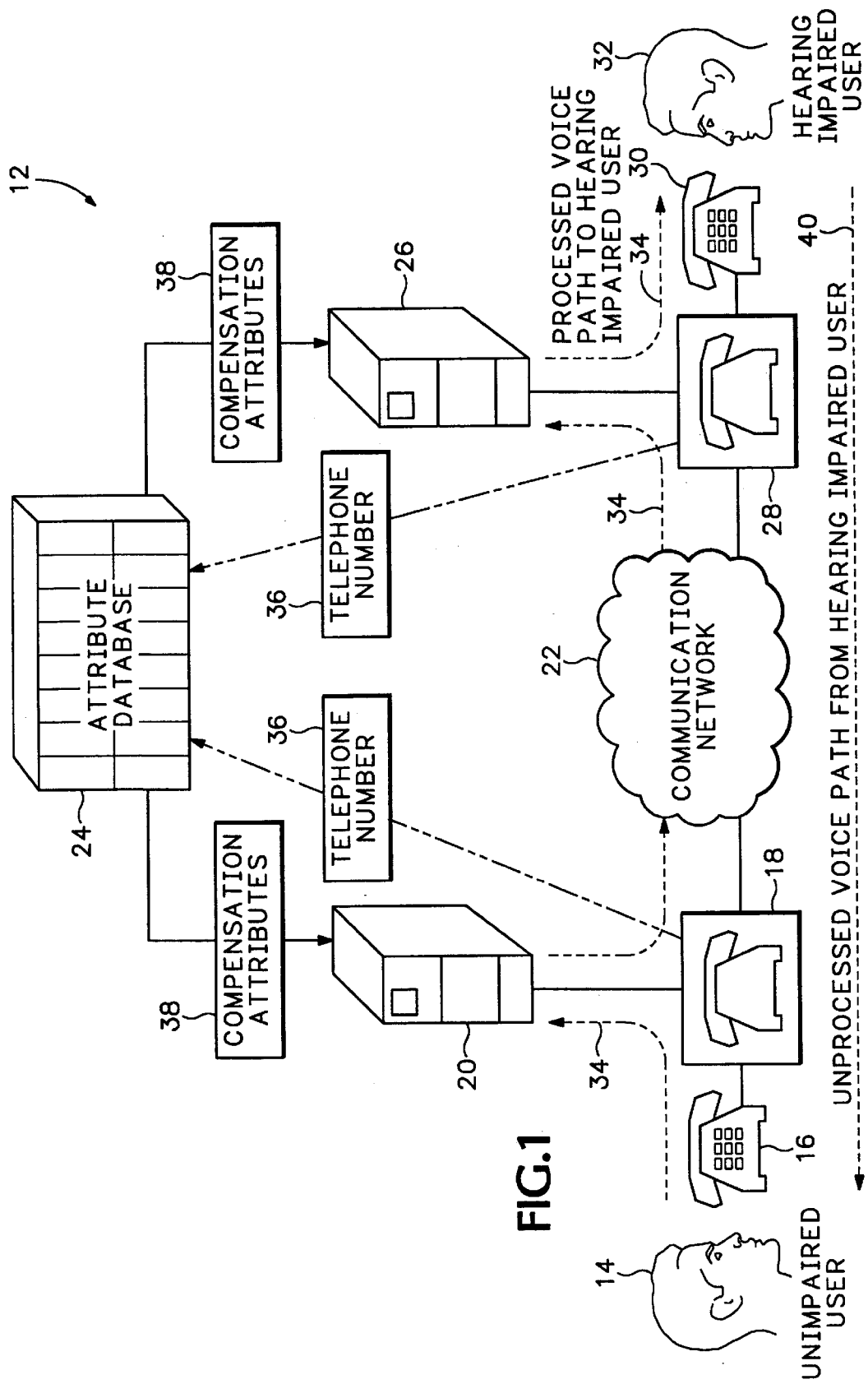
FIG. 1 is a hearing loss compensation system according to the invention.

Referring to FIG. 1, a hearing loss compensation system 12 provides customized frequency and gain compensation within a communication network 22. The compensation system 12 provides an audio compensation service for any telephone accessing communication network 22 through a telephone service provider. The communication network 22 circuit-switched Plain Old Telephone Service (POTS), a packet based network or any other communication system used for conducting telephone calls.

A telephone handset 16 is connected through an access device 18 to network 22 and a telephone handset 30 is connected through an access device 28 to the network 22. The access device 18 is coupled to an attribute database 24 and a signal processing system 20. The access device 28 is coupled to the attribute database 24 and a signal processing system 26. The signal processing systems 20 and 26 can be any computer resource, such as a digital signal processor, that performs the signal compensation techniques described below.

The signal processing systems 20 and 26 can be separate signal processing resources or can be incorporated with the codecs in access devices 18 and 28, respectively, used for encoding and decoding the audio signals from users 14 and 32. Signal processing systems used for encoding and decoding voice data are well known to those skilled in the art and are therefore not described in further detail.

In the case of a POTS system, the access devices 18 and 28 comprise telephone switches that provide circuit-switched voice path connections with other subscriber locations. The attribute database in the POTS system would typically be located at a telephone system Central Office (CO) and can be incorporated with the same or a separate but similar computer system at the CO used for voice mail and other customized telephone user services.

In the case of a packet based telephone network, the access devices 18 and 28 comprise gateways that packetize the audio signals and send the audio packets over the packet based communication network 22. The signal processing systems 20 and 26 for the packet based network can use the same or different computer resources used for providing the operations in the gateways 18 and 28, respectively. For the packet based telephone system, the attribute database is installed on a server or gatekeeper on the packet based communication network 22. Gatekeepers look up IP addresses associated with a destination telephone number and are commercially available from companies such as Cisco Systems, Inc., 170 West Tasman Drive, San Jose, Calif. 95134-1706.

A user identifies specific hearing impairments by taking a hearing test. Hearing compensation attributes are then determined from the hearing test results that compensate for the user's hearing loss. The telephone service provider is informed offline of the hearing compensation attributes determined from the hearing test. The telephone service provider stores the compensation attributes in a user profile in attribute database 24 and indexes the compensation attributes using the telephone number of the hearing impaired user.

In the example shown in FIG. 1, an unimpaired user 14 dials a telephone number 36 of the hearing impaired user 32. The dialed telephone number and the originating telephone number are monitored by the attribute database 24. If either the source or destination telephone number 36 match one of the numbers stored in the attribute database 24, the compensation attributes associated with that telephone number 36 are downloaded to one or both of signal processing systems 20 and 26.

A voice path 34 is established over communications network 22 between user 14 and 32 through one or both of signal processors 20 and 26. As explained above, in some telephone systems the voice path 34 may always go through signal processors 20 and 26 if the signal processors 20 and 26 are also used for conventional encoding and decoding of the voice signals of user 14 and 32. For purposes of explanation, FIG. 1 shows the signal processors 20 and 26 as separate devices from network access devices 18 and 28.

The signal processors 20 and 26 compensate the audio signals from user 14 to hearing impaired user 32 according to the compensation attributes 38 downloaded from attribute database 24. Because the user 14 is not hearing impaired, a voice path 40 from user 32 to user 14 is not compensated and does not pass through signal processor 26 or 20.

Figure 2:
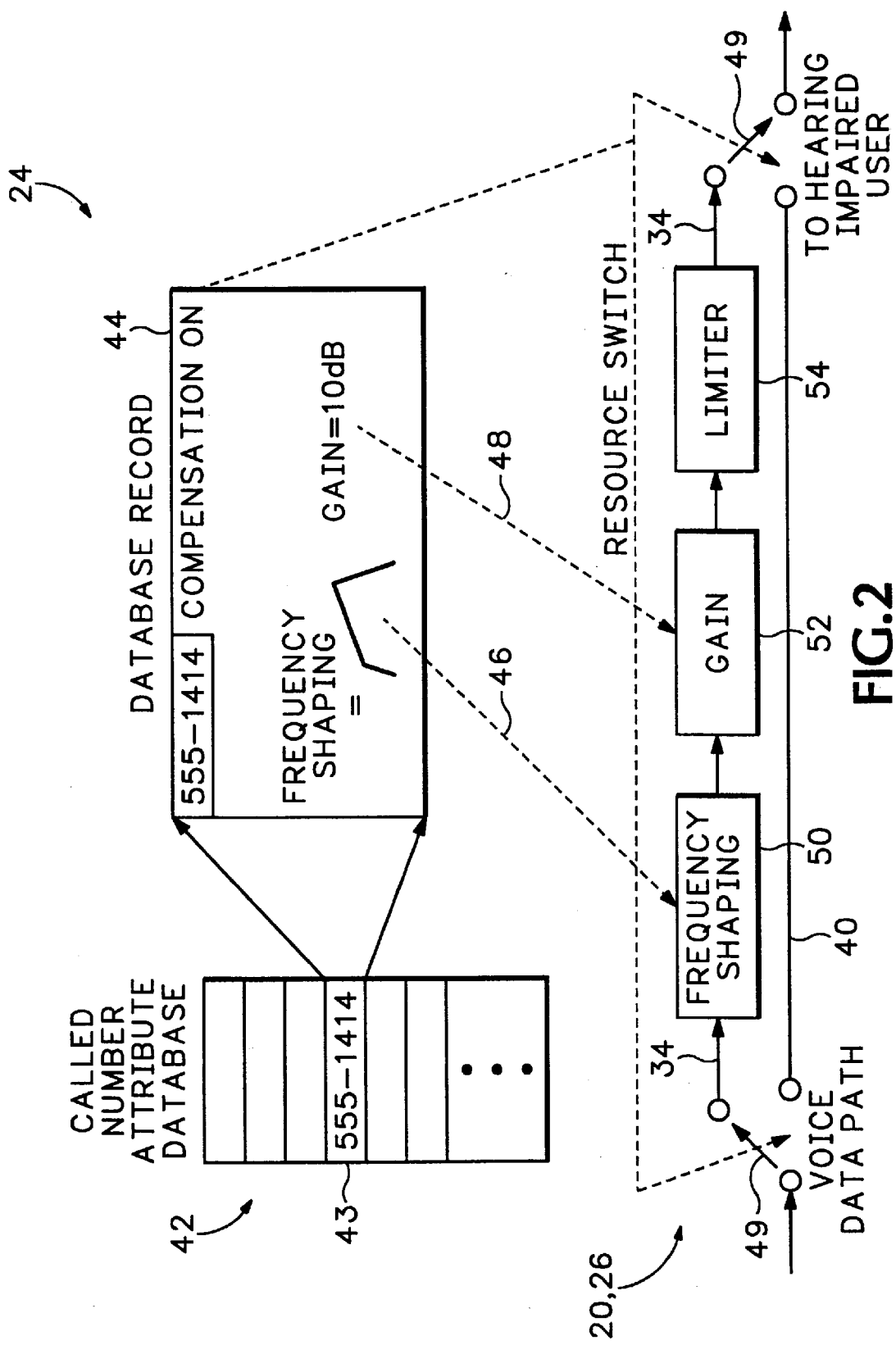
FIG. 2 is a detailed diagram of the hearing loss compensation system shown in FIG. 1.

FIG. 2 is a more detailed diagram showing how the compensation attributes 38 are downloaded to a particular signal processing system 20 or 26. The attribute database 24 includes a list of telephone numbers 42 for hearing impaired users who have subscribed to the hearing compensation service. Associated with each individual telephone number 43 is a database record 44 of compensation attributes. One attribute is a compensation ON or OFF designation that indicates whether the hearing impaired user has enabled voice compensation. When the hearing impaired user does not wish to have audio signals compensated for a period of time, audio compensation can be temporarily disabled by calling an access number to access the hearing compensation service and entering an appropriate telephone button selection that changes the compensation status to OFF.

A frequency shaping function 50 uses an inverted graph 46 of the audible dropouts for the hearing impaired user 32. The inverted graph 46 represents a customized compensation curve for the user 32 that compensates the specific frequencies normally outside the hearing range of the user 32. This type of processing is typically done by the signal processor 26 at the receive end of the voice signal. Frequency shaping is known to those skilled in the art. For example, similar frequency shaping can be provided in custom hearing aids.

Other hearing loss compensation can include increasing audio signal gain. A gain controller 52 is downloaded a compensation attribute 48 for controlling the gain of the audio signal supplied to hearing impaired user 32. A limiter 54 limits the sound level output from the gain controller 52 preventing distortion and maintaining a safe sound level if someone on the other end of the telephone call starts speaking loudly. The signal processors 20 and/or 26 implement the frequency shaping filter 50 gain controller 52 and gain limiter 54. The frequency shaping curve 46 and gain 48 compensation attribute 48 are downloaded from the attribute database 24 to the signal processor 20 and/or 26 on a per call basis. Different types and different combinations of audio compensation can be performed on the voice signals other than the frequency shaping, gain and gain limiting shown in FIG. 2.

Switches 49 represent logical routing of the audio signal 34 by the access devices 18 and 28. The switches 49 reroute the audio signal through the frequency shaping filter 50, gain controller 52 and gain limiter 54 when the compensation state for the telephone number 43 is ON. The switches 49 route the voice signal through the alternative path 40 that bypasses audio compensation in the signal processing systems 20 and 26 when the compensation state for the telephone number 43 is OFF or the telephone number of the telephone call does not match an entry 42 in the attribute data base 24. As mentioned above, the hearing loss compensation can be performed in one or both of signal processors 20 and 26.

Figure 3:
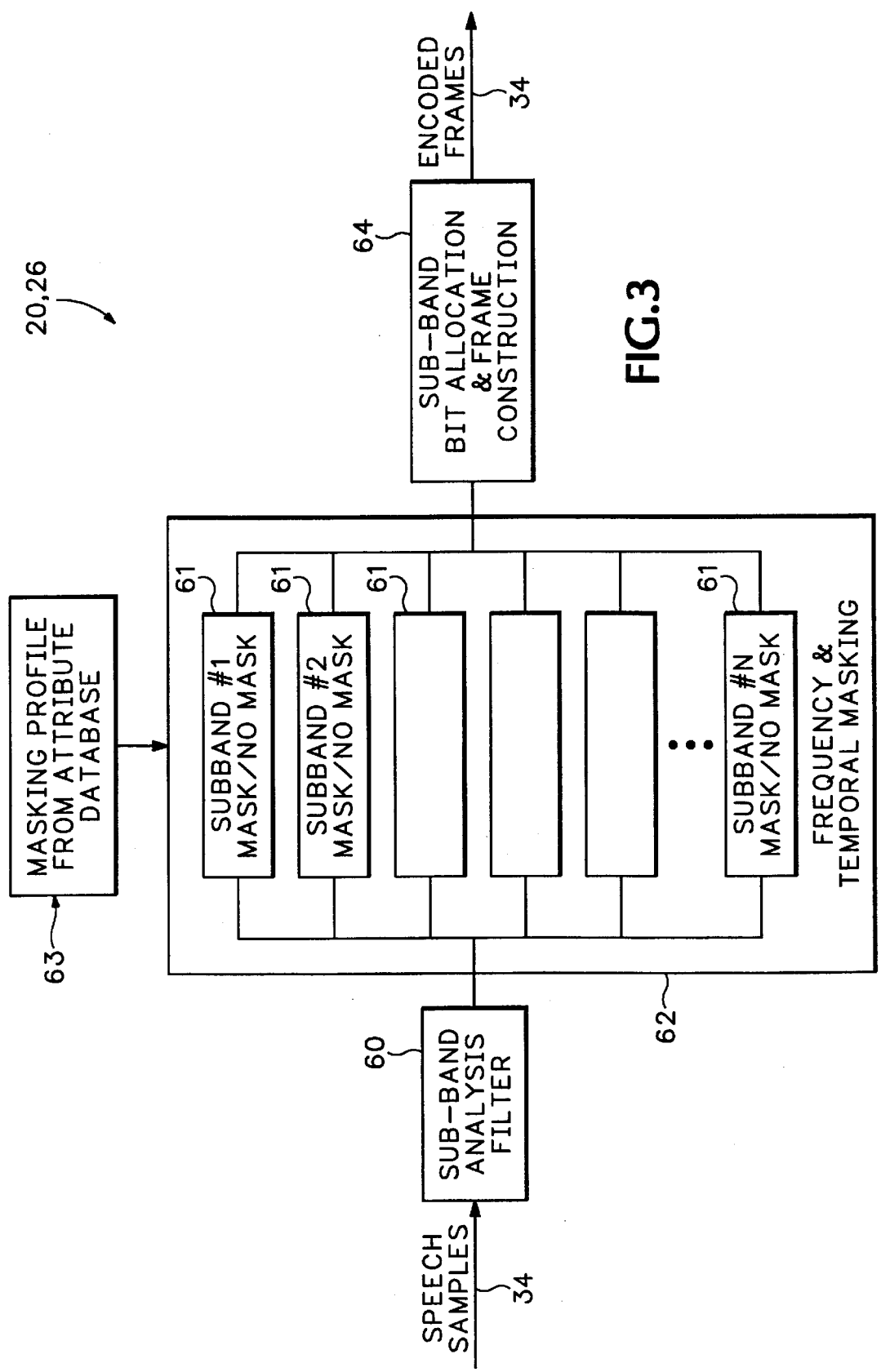
FIG. 3 is a diagram of a perceptual speech encoder for a transmit end of the compensation system shown in FIG. 1.
Figure 4:
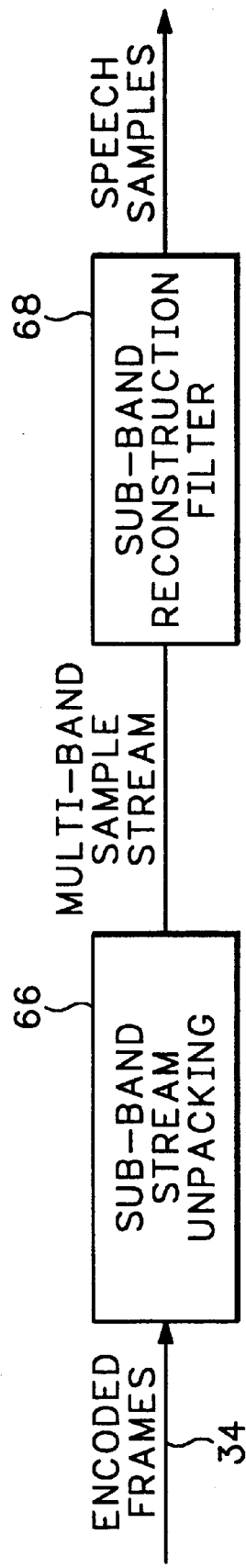
FIG. 4 is a diagram of a perceptual speech encoder for a receive end of the compensation system shown in FIG. 1.

FIGS. 3 and 4 show how perceptual speech processing is performed at the transmit (encoding) end and the receiving end (decoding) of the voice path 34 (FIG. 1). A speech encoder that performs perceptual speech processing separate the frequency shaping 50 shown in FIG. 2. Alternatively, the frequency shaping 50 is incorporated directly with a sub-band structure of the transmit encoder shown in FIG. 3.

A person's perceptual audio characteristics can involve frequency or temporal masking. The telephone service provider controls these encoding characteristics of the codec to better suit the audio characteristics of the listener. The frequency ranges that are outside the hearing range of the listener are thrown away and a better representation is made for the other frequencies that the listener can hear. In frequency and time space, certain frequency components tend to mask other frequency components. Certain frequency components may also be substantially attenuated in relation to other frequency components. It then may not be necessary to encode and transmit the attenuated components that are not recognizable by the hearing impaired listener. Existing bandwidth can therefore be used more effectively by transmitting higher quality reproductions of only the speech segments that the listener can hear.

In FIG. 3, a sub-band analysis filter 60 divides an incoming speech signal into multiple sample streams 61 of narrow frequency band content. For example, the speech signal may be divided into 16 frequency subbands of 250 Hertz (Hz) bandwidth from 0 to 4 thousand Hz (kHz). The masking circuit 62 uses a frequency and temporal masking profile 63 for the hearing impaired user measured during an a priori hearing test. The masking profile 63 identifies the frequency ranges that the listener cannot hear. The masking circuit 62 then masks out these identified frequency sub-bands.

The remaining speech bitstream output from masking circuit 62 is allocated bits that are then packaged into frames and sent to the receive end of the voice path 34. Instead of completely masking out certain frequency subbands masking circuit 62 may take more audio samples for the subbands frequencies within the hearing range of the user 32 and take fewer audio samples for subband frequencies that are mostly outside the hearing range of user 32.

Referring to FIG. 4, the encoded frames previously output from the speech encoder are unpacked at the receive end of the audio signal 34 into separate subbands in block 66. A subband reconstruction filter 68 reconstructs the subbands into a stream of speech samples. The speech samples are then compensated if necessary as previously described in FIG. 2. For example, frequency shaping and gain can be further tailored according to the hearing impairments of user 32.

Calls sent to the hearing impaired telephone can be redirected to another location (e.g., via call forwarding) and still continue to be audio compensated. For example, a call forwarded from a land line telephone to a cellular telephone can be compensated at the original endpoint associated with the hearing impaired user's telephone number. The compensated audio signal is then forwarded to the cellular telephone. This prevents the hearing impaired user from having to readjust mechanical equipment on each telephone they may happen to be using. The call forwarding feature also works with calls forwarded to other land lines.

If several people use the same telephone handset, distinctive ringing can be used to identify each user. The hearing impaired user picks up the handset for his or her associated ringing tone and is provided a compensated audio signal without having to adjust the speaker volume on the telephone. This also prevents the other telephone users from picking up and listening to compensated audio signals.

The compensation system 12 compensates for hearing loss based on attributes associated with the hearing impaired user's telephone number and allows a hearing compensation service to be built with both economies of scale while using existing signal processing resources. By using the existing signal processing resources in the communication network the compensation system is easy and inexpensive to implement. The compensation service can be invoked on any call made to or from a telephone number that has been provisioned for such a compensation service.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A hearing loss compensation system for a communication network, comprising:

an attribute database storing user identification numbers and associated records that identify compensation attributes for hearing impaired users, the attribute database examining telephone numbers in the communication network for matches with the stored user identification numbers; and a signal processing system compensating audio signals having telephone numbers matching the stored user identification numbers in the attribute database according to the compensation attributes associated with the matching user identification numbers, the compensation attributes controlling the encoding characteristics of the signal processing system so that frequency ranges identified in a matching one of the user identification numbers as being outside a hearing range of an identified one of the hearing impaired users are either discarded or encoded using fewer samples than frequency ranges identified as being within the hearing range of the identified one of the hearing impaired users.

2. A hearing loss compensation system according to claim 1 wherein the records in the attribute database further control the encoding characteristics of the signal processing system to encode an increased number of samples for frequency ranges identified in the matching one of the user identification numbers as being within the hearing range of the identified one of the hearing impaired users.

3. A hearing loss compensation system according to claim 1 wherein the signal processor includes the following:

a sub-band analysis filter for dividing the speech signal into multiple frequency sample streams;

a masking profile identifying frequency ranges outside of a hearing range of the identified one of the hearing impaired users; and a masking circuit that masks out the identified frequency ranges from the speech signal.

4. A hearing loss compensation system according to claim 1 wherein the communications network comprises a plain old telephone service.

5. A hearing compensation system according to claim 1 wherein the attribute database is located in a central office of the telephone system.

6. A hearing loss compensation system for a communication network, comprising:

an attribute database storing user identification numbers and associated records that identify compensation attributes for hearing impaired users, the attribute database examining telephone numbers in the communication network for matches with the stored user identification numbers; and a signal processing system compensating audio signals having telephone numbers matching the stored user identification numbers in the attribute database according to the compensation attributes associated with the matching user identification numbers, wherein the audio signals are compensated according to the compensation attributes associated with the matching user identification numbers at a first telephone call destination and the compensated audio signals then automatically forwarded to a second telephone call destination at a call forwarding telephone number.

7. A hearing compensation system for a communication network, comprising:

an attribute database storing user identification numbers and associated records that identify compensation attributes for hearing impaired users, the attribute database examining telephone numbers in the communication network for matches with the stored user identification numbers; and a signal processing system compensating audio signals having telephone numbers matching the stored user identification numbers in the attribute database according to the compensation attributes associated with the matching user identification numbers, the signal processing system includes a perceptual speech coder that masks frequency subbands outside the hearing range of the identified one of the hearing impaired users associated with the telephone call number.

8. A hearing compensation system according to claim 7 wherein the perceptual speech coder includes the following:

a sub-band analysis filter separating the audio signals into separate frequency subbands;

a frequency and temporal masking circuit that masks the frequency subbands identified in the attribute database; and a bit allocation circuit converting speech samples for the nonmasked frequency subbands into frames for sending over the communication network.

9. A hearing loss compensation system according to claim 8 including a perceptual speech decoder including a subband stream unpacking circuit for separating the frames back into multiple frequency subbands and a subband reconstruction filter that combines the frequency subbands into speech samples.

10. A hearing loss compensation system according to claim 7 wherein the signal processing system uses bandwidth normally allocated to the masked frequency subbands to encode additional speech samples for other nonmasked frequency subbands in the audio signal.

11. A method for compensating telephone calls in a communications network for hearing impaired users, comprising:

storing telephone numbers for the hearing impaired users;
  storing compensation attributes individually tailored for each one of the hearing impaired users, the compensation attributes identifying audio signal compensation that improves the hearing impaired user's ability to hear audio signals;
  monitoring the communications network at both an first telephone call location associated with one of the hearing impaired users and a second telephone call location associated with unimpaired hearing users for telephone numbers matching the stored telephone numbers for one of the hearing impaired users; and
  compensating the audio signals of telephone calls having numbers matching the stored telephone numbers according to the tailored compensation attributes for one of the hearing impaired users associated with the telephone number by downloading compensation attributes to one or both of the first telephone call location and the second telephone call location to compensate the audio signals received at the first telephone call location.

12. A method according to claim 11 wherein compensating the audio signals includes the following:

dividing the speech signal into multiple frequency sample streams;
  identifying frequency ranges outside of a hearing range of the identified hearing impaired user;
  masking out the identified frequency ranges from the speech signal; and
  encoding remaining non-masked frequency ranges in the speech signal.

13. A method according to claim 11 including compensating audio signals for telephone calls forwarded from a first stored hearing impaired telephone number to a second nonstored nonhearing impaired telephone number.

14. A method for compensating telephone calls in a communications network for hearing impaired users, comprising:

storing telephone numbers for the hearing impaired users;
  storing compensation attributes individually tailored for each one of the hearing impaired users, the compensation attributes identifying audio signal compensation that improves the hearing impaired user's ability to hear audio signals;
  monitoring the communications network for telephone numbers matching the stored telephone numbers of the hearing impaired users;
  compensating the audio signals of telephone calls having numbers matching the stored telephone numbers according to the tailored compensation attributes of the hearing impaired user associated with the telephone number; and
  tailoring per-call bandwidth requirements to the known impaired hearing loss of the users by using perceptual speech coders that transmit only speech information that is within the hearing range of the hearing impaired user.

15. A method for compensating telephone calls in a communications network for hearing impaired users, comprising:

storing telephone numbers for the hearing impaired users;
  storing compensation attributes individually tailored for each one of the hearing impaired users, the compensation attributes identifying audio signal compensation that improves the hearing impaired user's ability to hear audio signals;
  monitoring the communications network for telephone numbers matching the stored telephone numbers of the hearing impaired users;
  compensating the audio signals of telephone calls having numbers matching the stored telephone numbers according to the tailored compensation attributes of the hearing impaired user associated with the telephone number; and
  tailoring audio encoding to the known impaired hearing loss of the users by encoding more speech samples for frequency bands in the audio signal that are within the hearing range of the hearing impaired user and encoding fewer speech samples for frequency bands outside the hearing range of the hearing impaired user.

16. A method for compensating telephone calls in a communications network for hearing impaired users, comprising:

storing telephone numbers for the hearing impaired users;
  storing compensation attributes individually tailored for each one of the hearing impaired users, the compensation attributes identifying audio signal compensation that improves the hearing impaired user's ability to hear audio signals;
  monitoring the communications network for telephone numbers matching the stored telephone numbers of the hearing impaired users; and
  compensating the audio signals of telephone calls having numbers matching the stored telephone numbers according to the tailored compensation attributes of the hearing impaired user associated with the telephone number, wherein compensating the audio signals comprise frequency shaping the audio signals according to a priori audio testing data for the hearing impaired user.

17. A method for compensating telephone calls in a communications network for hearing impaired users, comprising:

storing telephone numbers for the hearing impaired users;
  storing compensation attributes individually tailored for each one of the hearing impaired users, the compensation attributes identifying audio signal compensation that improves the hearing impaired user's ability to hear audio signals;
  monitoring the communications network for telephone numbers matching the stored telephone numbers of the hearing impaired users; and
  compensating the audio signals of telephone calls having numbers matching the stored telephone numbers according to the tailored compensation attributes of the hearing impaired user associated with the telephone number, wherein compensating the audio signals of telephone calls comprises changing the gain of the audio signals.

18. A method for compensating telephone calls in a communications network for hearing impaired users, comprising:

storing telephone numbers for the hearing impaired users;

storing compensation attributes individually tailored for each one of the hearing impaired users, the compensation attributes identifying audio signal compensation that improves the hearing impaired user's ability to hear audio signals;

monitoring the communications network for telephone numbers matching the stored telephone numbers of the hearing impaired users;

compensating the audio signals of telephone calls having numbers matching the stored telephone numbers according to the tailored compensation attributes of the hearing impaired user associated with the telephone number; and limiting the gain of the telephone calls to prevent distortion.

19. A communications system that automatically compensates audio signals in telephone calls, comprising:

a communications network;

a first telephone handset coupled through a first network access device to the communications network and associated with an unimpaired hearing user;

a second telephone handset coupled through a second network access device to the communications network and associated with a hearing impaired user;

a first signal processing system coupled to the first network access device;

a second signal processing system coupled to the second network access device;

an audio compensation system coupled to both the first and second network access device and the first and second signal processing system, the compensation system automatically downloading compensation attributes to one or both of the first and second signal processing system for compensating the audio signals received by the second user.

* * * * *

UNITED STATES PATENT AND TRADEMARK OFFICE
CERTIFICATE OF CORRECTION

PATENT NO. : 6,061,431
DATED : May 9, 2000
INVENTOR(S) : Knappe et al.

Page 1 of 1

It is certified that error appears in the above-identified patent and that said Letters Patent is hereby corrected as shown below:

Column 4,
Line 3, "gain 48 compensation" should read -- gain compensation --
Line 53, "an a priori" should read -- a prior --

Column 7,
Line 21, "an" should read -- a --

Column 8,
Line 48, "priori" should read -- prior --

Signed and Sealed this

Sixteenth Day of April, 2002

Attest:

JAMES E. ROGAN
*Attesting Officer*   *Director of the United States Patent and Trademark Office*